United States Patent
Kim

[11] Patent Number: 6,052,252
[45] Date of Patent: Apr. 18, 2000

[54] ADAPTIVE FEED FORWARD DEVICE FOR REDUCING CURRENT CONTROL ERRORS

[75] Inventor: Gwan-Il Kim, Seongnam, Rep. of Korea

[73] Assignee: Samsung Electronics Co., Ltd., Suwon, Rep. of Korea

[21] Appl. No.: 08/841,603

[22] Filed: Apr. 30, 1997

[30] Foreign Application Priority Data

Apr. 30, 1996 [KR] Rep. of Korea ............... 96/13889

[51] Int. Cl.[7] ............................................. G11B 5/596
[52] U.S. Cl. ............................ 360/78.09; 360/78.04; 318/560; 318/561; 318/611; 364/165
[58] Field of Search ........................ 360/78.09, 78.07, 360/78.06, 78.04; 318/560–561, 611, 615–616, 590, 594, 629–630, 632; 364/164, 165; 369/32

[56] References Cited

U.S. PATENT DOCUMENTS

| | | |
|---|---|---|
| 4,038,536 | 7/1977 | Feintuch ................... 708/322 |
| 4,093,904 | 6/1978 | Burig et al. ............... 318/616 |
| 4,200,827 | 4/1980 | Oswald .................... 318/561 |
| 4,297,734 | 10/1981 | Laishley ................. 360/78.09 |
| 4,669,004 | 5/1987 | Moon et al. . |
| 4,789,975 | 12/1988 | Taniyama . |
| 5,065,263 | 11/1991 | Yoshida et al. .......... 360/77.03 |
| 5,073,747 | 12/1991 | Dupraz et al. . |
| 5,126,689 | 6/1992 | Nakamura . |
| 5,150,379 | 9/1992 | Baugh et al. ............. 375/232 |
| 5,184,257 | 2/1993 | Koga et al. . |
| 5,204,594 | 4/1993 | Carobolante . |
| 5,248,921 | 9/1993 | Kato et al. . |
| 5,270,627 | 12/1993 | Rehse . |
| 5,272,423 | 12/1993 | Kim . |
| 5,301,072 | 4/1994 | Wilson . |
| 5,305,158 | 4/1994 | Ueda et al. . |
| 5,313,147 | 5/1994 | Yoneda et al. . |
| 5,406,182 | 4/1995 | Iwashita . |
| 5,473,230 | 12/1995 | Dunn et al. . |
| 5,548,192 | 8/1996 | Hanks . |
| 5,592,345 | 1/1997 | Carobolante et al. . |

Primary Examiner—W. Chris Kim
Assistant Examiner—Dan I. Davidson
Attorney, Agent, or Firm—Robert E. Bushnell, Esq.

[57] ABSTRACT

An adaptive feed forward device for decreasing current control errors, includes an adaptive feed forward controller which provides adaptive feed forward values, establishing a linear slope flexibly adjusting to the current command values for the servo control of the hard disk drive, in a deceleration section of the servo control during a track seek.

23 Claims, 4 Drawing Sheets

ADAPTIVE FEED FORWARD DEVICE FOR REDUCING CURRENT CONTROL ERRORS

CLAIM OF PRIORITY

This application makes reference to, incorporates the same herein, and claims all benefits accruing under 35 U.S.C. §119 from an application for ADAPTIVE FEED FORWARD DEVICE FOR REDUCING CURRENT CONTROL ERRORS earlier filed in the Korean Industrial Property Office on the $30^{th}$ day of Apr. 1996 and there duly assigned Ser. No. 13889/1996, a copy of which application is annexed hereto.

BACKGROUND OF THE INVENTION

1. Field of the Invention

This invention relates to a hard disk drive. Specifically, this invention relates to an adaptive feed forward device for reducing current control errors.

2. Description of the Related Art

An earlier servo controller having a feed forward device which reduces control errors during the servo control of a hard disk drive is composed of a plant which is an object of the servo control, an angle to position converter, a digital signal processor for servo controlling the plant, a digital to analog converter, and an adder. The plant generates an angle value which is sent to the angle to position converter which converts the angle information into position information which is then sent to the digital signal processor.

The digital signal processor is composed of an estimator, a velocity commander and an adder, a gain controller, and a feed forward controller for reducing control errors.

The estimator receives position information from the angle to position converter and a previous current command value from the feed forward controller through the gain controller and then calculates a position estimation value, a velocity estimation value, and a disturbance estimation value using predetermined estimation functions. The velocity commander sends a velocity command value to the adder in response to the position estimation value and the adder calculates a velocity error by subtracting the velocity estimation generated by the estimator from the velocity command value from the velocity commander. The velocity error is sent to the gain controller which receives the velocity from the adder and both the position estimation value and the disturbance estimation value from the estimator. The gain controller produces gains according to a predetermined formula represented by predetermined gain transfer functions. The outputs of the gain controller are current command values for servo control of the plant. The feed forward controller is connected to the output of the gain controller to reduce current control errors. The current command value is generated only after the current control errors have been reduced by feed forward controller.

The feed forward controller includes a memory, a switch, and an adder. The memory contains a predetermined fixed feed forward value. The switch switches on and off according to an external feed forward control and the adder sums the output of the gain controller and the predetermined feed forward value when switch is closed, resulting in the current command value. The current command value is converted to an analog value by the digital to analog converter which generates a driving current value for the plant. The plant is driven in response thereto.

The feed forward controller is necessary in that the current command value may have negative values which approach zero at the end of deceleration portion of a servo control. To generate a negative current command value without utilizing a feed forward controller, the gain controller must increase the gain of a signal by a great amount. However, as the gain increases, noise also increases.

To decrease noise caused by the current control, the feed forward controller is utilized. The feed forward value, which is constant in earlier servo controllers, represents a deceleration and is supplied to the adder of the feed forward controller during a predetermined portion of the deceleration. The switch of the feed forward controller is closed by the external feed forward control during this predetermined portion.

Since the feed forward value is supplied to the adder during the predetermined portion of the deceleration, the gain controller does not have to increase the signal gain and therefore, the noise contained in the current command value, generated by the digital signal processor, does not increase and the noise caused by the current control decreases.

Although the above noted use of the feed forward technique decreases the noise resulting from the current control, the use of a fixed feed forward value causes a current control error which causes problems of its own.

The patents to Yoneda et al., Iwashita, and Hanks, U.S. Pat. Nos. 5,313,147, 5,406,182 and 5,548,192, respectively entitled Digital servo-Control Apparatus, Method For Controlling A Servomotor, and Adaptive Feedback System For Controlling Head/Arm Position In A Disk Drive, each disclose control systems having adaptive feed forward devices. However, these patents fail to teach or suggest the adaptive feed forward technique of the present invention.

The following additional patents each disclose features in common with the present invention but do not teach or suggest the specific adaptive feed forward technique of the present invention.

U.S. Pat. No. 5,592,345 to Carobolante et al., entitled Feedforward Circuit And Method For Controlling The Speed Of A Spindle Motor In A Disk Drive, U.S. Pat. No. 5,248,921 to Kato et al., entitled Servo Motor Control Device, U.S. Pat. No. 5,270,627 to Rehse, entitled Machine Tool Control system, U.S. Pat. No. 5,272,423 to Kim, entitled Velocity Control Method For A Synchronous AC ServoMotor, U.S. Pat. No. 5,305,158 to Ueda et al., entitled Positioning Control Apparatus, U.S. Pat. No. 5,073,747 to Dupraz et al., entitled Feedback System Control Device And Applications In Amplifiers And Servomechanisms, U.S. Pat. No. 5,473,230 to Dunn et al., entitled Torque Disturbance Precompensation For Disk Drive Spindle Motors, U.S. Pat. No. 5,301,072 to Wilson, entitled Sample Data Position Error Signal Detection For Digital Sector Servo, U.S. Pat. No. 5,204,594 to Carobolante, entitled Circuit For Providing A Signal Proportional To The Average Current Flowing Through Coils Of A Motor Operated In Both Linear And PWM Modes, U.S. Pat. No. 5,184,257 to Koga et al., entitled Head Positioning Control For A Spindle Motor Disk Drive, U.S. Pat. No. 5,126,689 to Nakamura, entitled Direct-Coupled Grounded-Base Amplifier, Semiconductor Device And Information Processing Device Having The Amplifier Therein, U.S. Pat. No. 4,789,975 to Taniyama, entitled Apparatus For Recording And/Or Reproducing Data Signal On Or From Disk Shaped Recording Medium At A Variably Selected Constant Linear Velocity, and U.S. Pat. No. 4,669,004 to Moon et al., entitled High Capacity Disk File With Embedded Sector Servo.

SUMMARY OF THE INVENTION

An objective of the present invention is to provide an adaptive feed forward controller for decreasing current control errors.

To achieve the objective of this invention, an adaptive feed forward controller for decreasing current control errors is provided. The controller includes an adaptive feed forward control for generating adaptive feed forward values creating a linear slope, which are adapted to current command values for the servo control of the hard disk drive during deceleration sections while track seeking.

BRIEF DESCRIPTION OF THE DRAWINGS

A more complete appreciation of the invention, and many of the attendant advantages thereof, wil be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
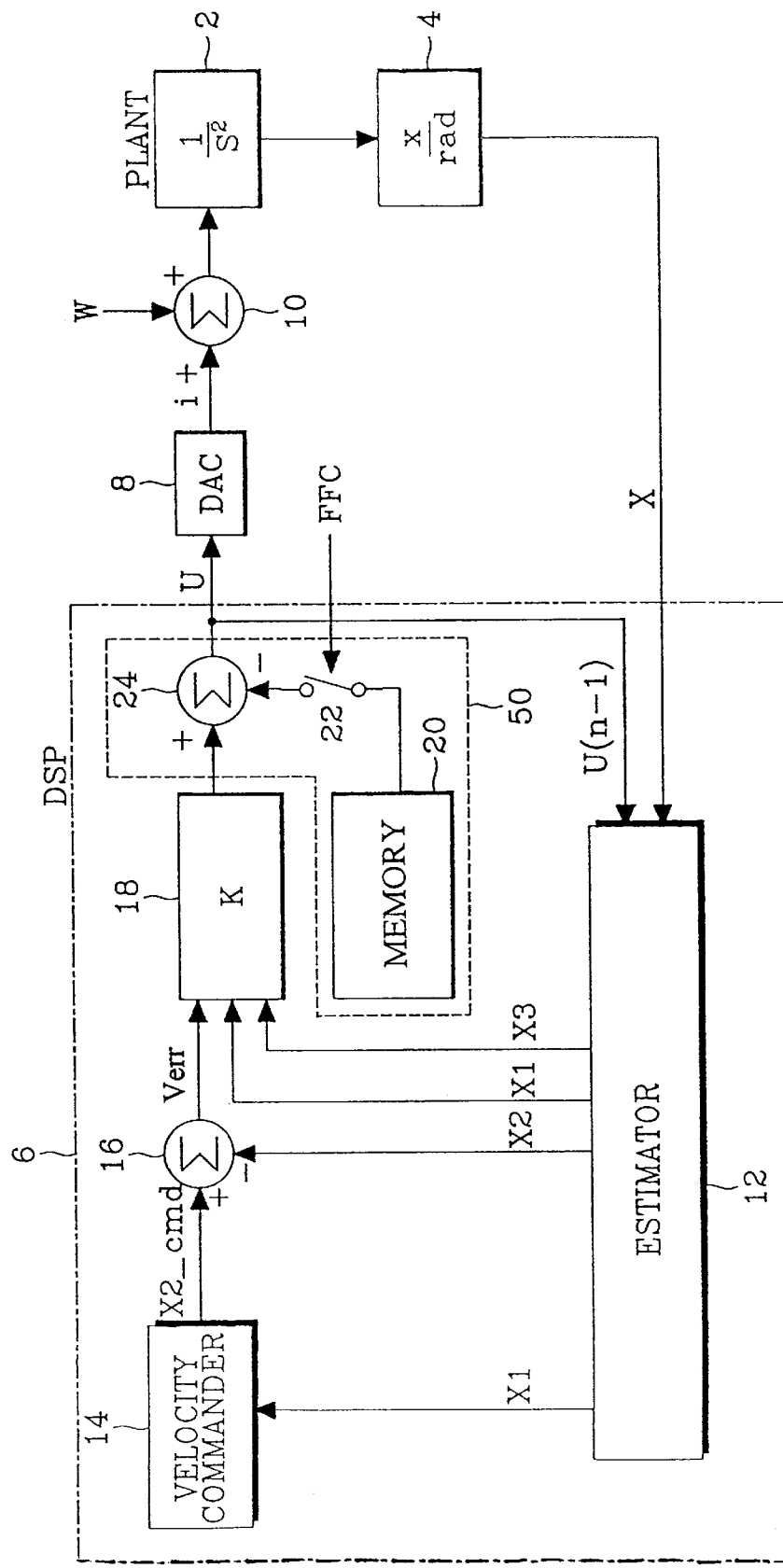
FIG. 1 is a block diagram of an earlier servo controller having a feed forward control.

FIG. 1 is a block diagram of an earlier servo controller having a feed forward device which reduces control errors during the servo control of a hard disk drive.

As shown in FIG. 1, the servo controller is composed of plant 2 which is an object of the servo control, an angle/position converter 4, a digital signal processor (DSP) 6 for servo-controlling the plant 2, a digital to analog converter (DAC) 8, and an adder 10. The term $$\frac{1}{S^2}$$

of the plant 2 is a Laplace transform corresponding to direct current motor characteristics. The plant 2 generates an angle value represented by radian θ, according to a motor rotation, the angle information being sent to the angle/position converter 4. The angle/position converter 4 converts the angle information θ into position information, which is then sent to the DSP 6.

The DSP 6 is composed of an estimator 12, a velocity commander 14, an adder 16, a gain controller 18, and a feed forward controller 50, for reducing control errors. The estimator 12 of the DSP 6 receives position information X from the angle/position converter 4 and a previous current command value, U(n−1), from the feed forward controller 50 through gain controller 18 and then calculates a position estimation value X1, a velocity estimation value X2, and a disturbance estimation value X3 using predetermined estimation functions. The velocity commander 14 sends a velocity command value, X2_cmd, to the adder 16, in response to the position estimation value X1. Adder 16 calculates a velocity error, Verr, by subtracting the velocity estimation X2, generated by the estimator 12, from the velocity command value X2_cmd from velocity commander 14. The velocity error, Verr, is sent to the gain controller 18. The gain controller 18 receives the velocity error, Verr, from the adder 16, and both the position estimation value X1 and the disturbance estimation value X3 from the estimator 12. The gain controller 18 produces gains according to a predetermined formula represented by gain transfer functions K1, K2, and K3. The outputs of the gain controller 18 are current command values for servo control of the plant 2. The feed forward controller 50 is connected to the output of the gain controller 18 to reduce current control errors. The current command value U is generated only after the current control errors have been reduced by feed forward controller 50.

The feed forward controller 50 includes a memory 20, a switch 22, and an adder 24. The memory 20 contains a predetermined feed forward value. The switch 22 switches "OFF" or "ON" according to an external feed forward control (FFC). The adder 24 sums the output of gain controller 18 and the predetermined feed forward value when switch 22 is closed, resulting in the current command value U. The current command value U is converted to an analog value by the DAC 8. The DAC 8 generates a driving current value I for the plant 2. The plant 2 is driven in response to it. Reference character "W" of FIG. 1 represents a disturbance.

The reason why the feed forward controller 50 must included in a servo controller is explained below with reference to FIG. 3, which shows the feed forward operation of the servo controller of FIG. 1.

Figure 3:
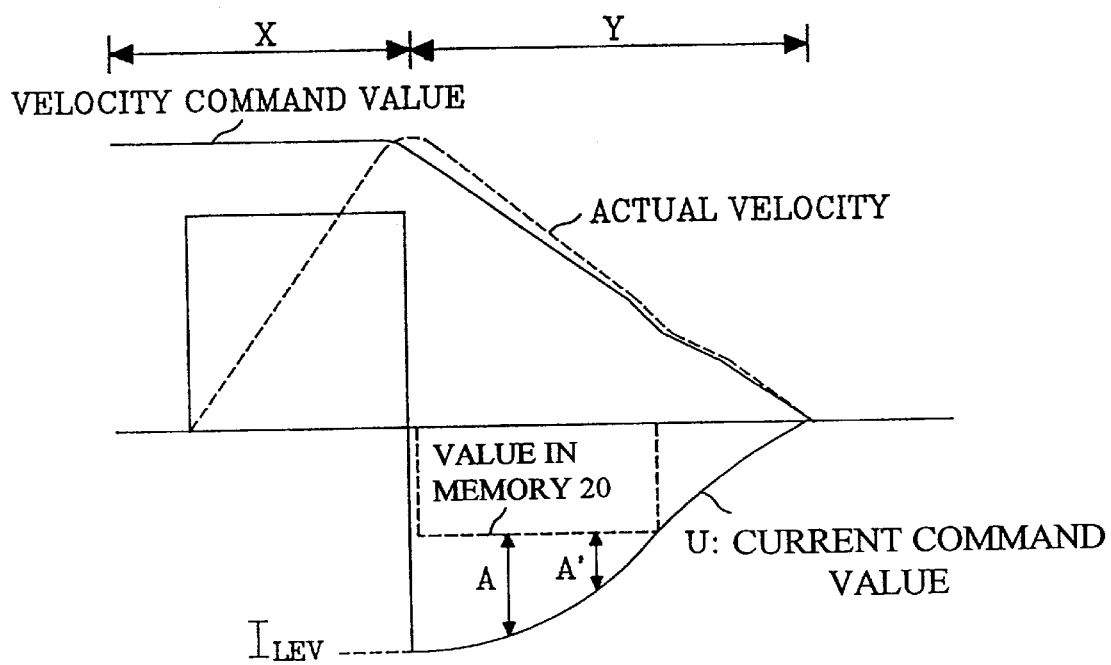
FIG. 3 shows a feed forward value according to the controller of FIG. 1.

As shown in FIG. 3, a searching operation during servo control is divided into: an acceleration section X, where an actual velocity increases in response to the velocity command value; and a deceleration section Y, where the actual velocity decreases in response to decreases in the velocity command value. The current command value U, output by the DSP 6, is constant in acceleration section X, but it has negative values which approach "zero" at the end of section Y. FIG. 3 shows that the initial current command value of the deceleration section Y, $I_{LEV}$, is a negative value. To generate the current command value U with a negative value without utilizing the feed forward value stored in the memory 20, the gain controller 18 of FIG. 1 must increase the gain of a signal much more. However, as the gain increases, noise also increases. For example, if it is assumed that a signal is "10", where the noise of the signal is "2", and the gain is "3", the actual signal becomes "24", although the signal should be "30". In this case the difference "6" is noise. When the gain increases, the noise also increases.

To decrease noise caused by the current control, the feed forward value stored in memory 20 must be utilized. The feed forward value stored in the memory 20, which represents a deceleration, is supplied to the adder 24 during a predetermined portion of the deceleration section Y. Switch 22 is closed by the external feed forward control (FFC) during this predetermined period.

Since the feed forward value stored in the memory 20 is supplied to adder 24 during the predetermined portion of deceleration section Y, the gain controller 18 does not have to increase the signal gain. Therefore, the noise contained in the current command value U, generated by the DSP 6, does not increase, and the noise, caused by the current control, decreases.

Although the above-noted use of the feed forward technique decreases the noise resulting from the current control, there is a limitation. As shown in FIG. 3, there are differences, A and A', between the current command value U and feed forward value stored in the memory 20 in the deceleration section Y. From this point forward, the difference is called a current control error. Current control errors such as A and A' occur because the feed forward value has a constant DC value.

With reference to the attached drawings, a preferred embodiment of the present invention is described below in detail, In the description, components are given reference numbers that are consistent throughout this specification even when elements are displayed in different drawings.

Figure 2:
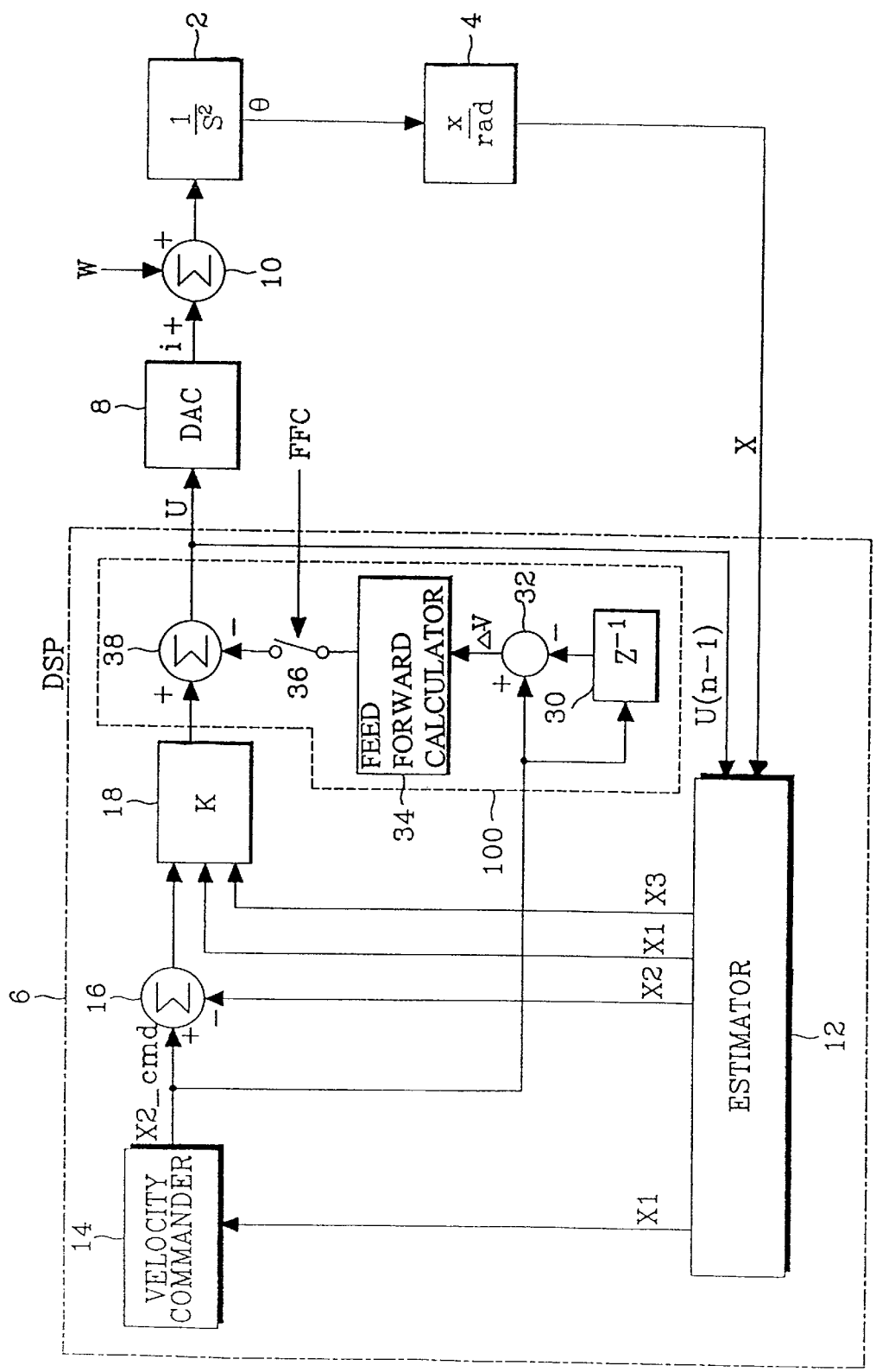
FIG. 2 is a block diagram of the servo controller having an adaptive feed forward control according to the present invention.

The servo controller of FIG. 1, has the feed forward controller 50, whereas the servo controller of FIG. 2, according to the present invention, has an adaptive feed forward controller 100. The other elements and their operations in the present invention are similar to those of the controller of FIG. 1.

As shown in FIG. 2, the adaptive feed forward controller 100 includes a delay 30, adders 32 and 38, a feed forward calculator 34, and a switch 36. A velocity command value X2_com, generated by the velocity commander 14, is both directly and through the delay 30, sent to the adder 32. The output of the adder 32 is sent to the feed forward calculator 34. The output of the feed forward calculator 34 is sent to the adder 38.

Figure 4:
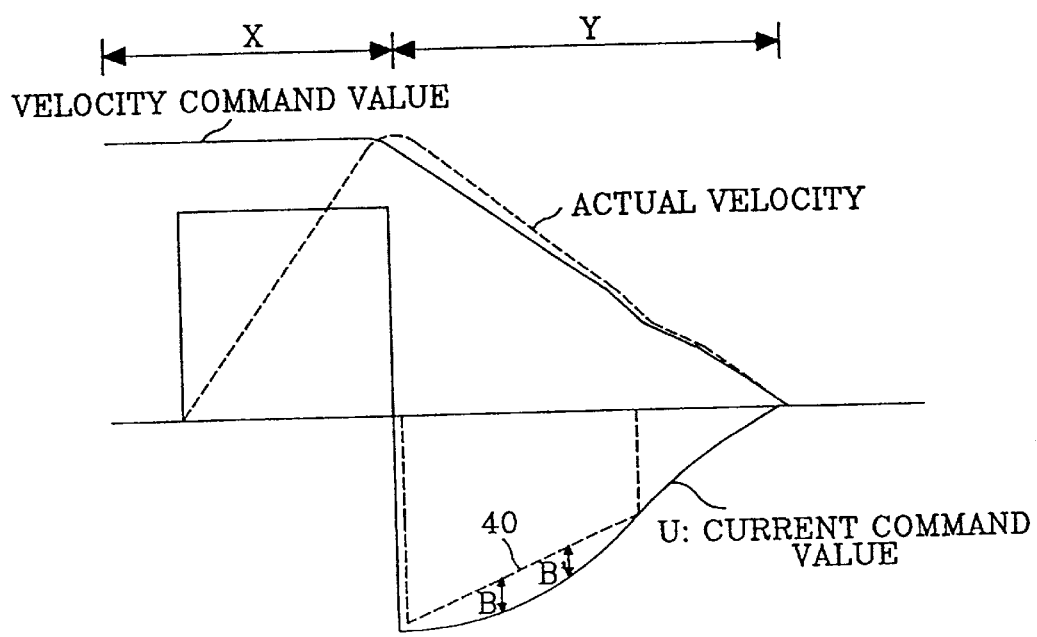
FIG. 4 shows the feed forward value according to the present invention.

As shown in FIG. 4, an adaptive feed forward value 40 flexibly adjusts to the current command value, unlike the feed forward value stored in the memory 20 of the controller of FIG. 1. Since adaptive feed forward value 40, shown in FIG. 4, establishes a linear slope, the control error values B and B', with the preferred embodiment of the present invention, are less than those of the controller of FIG. 1, A and A'. The current control error values B and B', with the present invention, are also usually uniform. Such uniform error values make current control possible with small gains and without special adjustments of the gains according to each closed loop.

The feed forward value 40, shown in FIG. 4, is calculated by the feed forward calculator 34 in the adaptive feed forward controller 100, of FIG. 2. The feed forward calculator 34 creates the adaptive feed forward value 40 using the following formula (1).

$$\text{Adaptive feed forward value} = \frac{J \times V_{\max}}{A_{rml} \times K_T \times I_{\max} \times \Delta t} \times \Delta V \qquad (1)$$

where J is an actuator inertia, $K_T$ is a torque coefficient, $A_{rml}$ is a length of an arm, $V_{max}$ is a maximum motor velocity, $I_{max}$ is a maximum current for a motor, $\Delta t$ is a servo sample interval, and $\Delta V$ is a "velocity command value(n)–velocity command value(n−1)". $J$, $K_T$, $A_{rml,\ Vmax}$, $I_{max}$ and $\Delta t$ among the above variables are always constant, whereas $\Delta V$ varies during operation. The $\Delta V$ {velocity command value(n)−velocity command value(n−1)}, is calculated from the velocity command value X2_cmd from velocity commander 14 shown in FIG. 2.

With reference to FIG. 2, the adder 32 in the adaptive feed forward controller 100, receives the velocity command value X2_com from the velocity commander 14 as a present velocity command value (n). It also receives the previous velocity command value (n−1), which is delayed by the delay 30. The adder 32 calculates $\Delta V$ by subtracting the previous velocity command value (n−1) from the present velocity command value (n). The $\Delta V$ is used by the feed forward calculator 34.

The feed forward calculator 34 receives the $\Delta V$, and then calculates the feed forward value using formula (1). The feed forward calculator 34 transmits the adaptive feed forward value 40 to the switch 36. The switch 36 closes in response to the external feed forward control FFC, so as to transmit feed forward value 40, required for the deceleration section, to the adder 38. The adder 38 generates the current command value U after adding the feed forward 40 to the current control value from the gain controller 18.

As described above, the present invention generates adaptive feed forward values, creating a linear slope flexibly adjusting to current command values for a disk servo control in a deceleration section of servo control, during track seeking, thereby decreasing current control errors.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An adaptive feed forward device providing feed forward values decreasing noise caused by current control during servo control in a hard disk drive, the device comprising:

a first system generating a velocity command value for the servo control and a just previous velocity command value; and a second system receiving said velocity command value and said just previous velocity command value, calculating a difference between said velocity command value and said just previous velocity command value, calculating and outputting adaptive feed forward values according to said difference and a predetermined feed forward calculation, in a deceleration portion of the servo control during a track seek, wherein said adaptive feed forward values are used in establishing a linear slope flexibly adjusting to current command values for the servo control of the hard disk drive.

2. The device of claim 1, said second system further comprising calculating said adaptive feed forward values using the following formula:

$$\text{adaptive feed forward value} = \frac{J \times V_{\max}}{A_{rml} \times K_T \times I_{\max} \times \Delta t} \times \Delta V$$

where J is an actuator inertia, $K_T$ is a torque coefficient, $A_{rml}$ is a length of an arm, $V_{max}$ is a maximum motor velocity, $I_{max}$ is a maximum motor current, $\Delta t$ is a servo sample interval, and $\Delta V$ is a present velocity command value minus a just previous velocity command value.

3. The adaptive feed forward device of claim 1, said first system further comprising:

a velocity commander generating said velocity command value; and a delay receiving said velocity command value, and outputting said just previous velocity command value in accordance with said velocity command value.

4. The adaptive feed forward device of claim 3, said second system further comprising an adder receiving said velocity command value from said velocity commander, said adder receiving said just previous velocity command value from said delay.

5. The adaptive feed forward device of claim 4, said second system further comprising a feed forward calculator receiving said difference, performing said calculating of the adaptive feed forward values, and performing said outputting of the adaptive feed forward values.

6. The adaptive feed forward device of claim 1, said second system further comprising an adder receiving said velocity command value and said just previous velocity command value from said first system, said adder outputting said difference.

7. The adaptive feed forward device of claim 6, said second system further comprising a feed forward calculator receiving said difference, performing said calculating of the adaptive feed forward values, and performing said outputting of the adaptive feed forward values.

8. An adaptive feed forward device which provides feed forward values for decreasing noise caused by current control during servo control in a hard disk drive, the device comprising:

a velocity commander for generating a velocity command value for the servo control;

a generating means for generating a just previous velocity command value from an output of the velocity commander;

a calculator for calculating a difference between said velocity command value and said just previous velocity command value from the velocity commander; and a feed forward calculator for calculating and outputting adaptive feed forward values, used in establishing a linear slope flexibly adjusting to current command values for the servo control of the hard disk drive, according to the velocity command value difference and a predetermined feed forward calculation, in a deceleration portion of the servo control during a track seek.

9. The adaptive feed forward device according to claim 8, said generating means comprising a delay for receiving said velocity command value and for generating said just previous velocity command value.

10. An adaptive feed forward device for a servo controller, the adaptive feed forward device comprising:

a generating means for generating a present velocity command value and a just previous velocity command value;

a calculator for calculating a difference between said present velocity command value and said just previous velocity command value; and a feed forward calculator for calculating and outputting feed forward values that establish a linear slope flexibly adjusting to current command values of the servo controller according to the calculated velocity command value difference from said calculator during a deceleration portion of a servo control by the servo controller.

11. The adaptive feed forward device according to claim 10, with:

said calculator comprising an adder for receiving said present velocity command value; and said generating means comprising a delay for receiving said present velocity command value and for generating said just previous velocity command value.

12. The adaptive feed forward device according to claim 10, said generating means comprising a delay for receiving said present velocity command value and for generating said just previous velocity command value.

13. An apparatus, comprising:

an adaptive feed forward device providing feed forward values decreasing noise caused by current control during servo control by a servo controller, said adaptive feed forward device comprising:

a first adder receiving a velocity command value for the servo control and a just previous velocity command value, calculating a difference between said velocity command value and said just previous velocity command value, and outputting said difference;

a delay receiving said velocity command value and outputting said just previous velocity command value to said first adder in accordance with said velocity command value;

a feed forward calculator receiving said difference from said first adder, and calculating and outputting adaptive feed forward values, used in establishing a linear slope flexibly adjusting to current command values for the servo control of the hard disk drive, according to said difference and a predetermined feed forward calculation, in a deceleration portion of the servo control during a track seek.

14. The apparatus of claim 6, further comprising a first system outputting said velocity command value to said first adder and said delay.

15. The apparatus of claim 14, further comprising a second adder receiving the adaptive feed forward values output from said feed forward calculator.

16. The apparatus of claim 13, further comprising a second adder receiving the adaptive feed forward values output from said feed forward calculator.

17. An adaptive feed forward device which provides feed forward values for decreasing noise caused by current control during servo control by a servo controller, the device comprising:

a velocity commander for generating a velocity command value for the servo control;

a generating means for generating a just previous velocity command value from an output of the velocity commander;

a calculator for calculating a difference between said velocity command value and said just previous velocity command value from the velocity commander; and a feed forward calculator for calculating and outputting adaptive feed forward values, used in establishing a linear slope flexibly adjusting to current command values for the servo control by the servo controller according to the velocity command value difference and a predetermined feed forward calculation during a deceleration portion of the servo control by the servo controller.

18. The adaptive feed forward device according to claim 17, said generating means comprising a delay for receiving said velocity command value and for generating said just previous velocity command value.

19. An apparatus, comprising:

an adaptive feed forward device providing a feed forward value decreasing noise caused by current control during servo control in a hard disk drive, said device comprising:

a first unit generating a present velocity command value for the servo control; and a second unit receiving said present velocity command value and a previous velocity command value, establishing a linear slope flexibly adjusting to current command values for the servo control of the hard disk drive in a deceleration portion of the servo control during a track seek, in accordance with a difference between said present velocity command value and said previous velocity command value and according to a predetermined feed forward calculation.

20. The apparatus of claim 19, further comprising said second unit calculating and outputting adaptive feed forward values.

21. The apparatus of claim 20, further comprising said first unit generating said previous velocity command value.

22. The apparatus of claim 21, further comprising said second unit calculating said difference between said present velocity command value and said previous velocity command value.

23. The apparatus of claim 22, further comprising said second unit performing said calculating of the adaptive feed forward values in accordance with the following formula:

$$\text{adaptive feed forward value} = \frac{J \times V_{\max}}{A_{rml} \times K_T \times I_{\max} \times \Delta t} \times \Delta V$$

where J is an actuator inertia, $K_T$ is a torque coefficient, $A_{rml}$ is a length of an arm, $V_{max}$ is a maximum motor velocity, $I_{max}$ is a maximuin motor current, $\Delta t$ is a servo sample interval, and $\Delta V$ is a present velocity command value minus a previous velocity command value.

* * * * *